Sept. 4, 1962    C. G. SHEPHERD    3,052,372
HINGE STRUCTURE

Filed Feb. 29, 1960    2 Sheets-Sheet 1

Inventor
CHARLES GREY SHEPHERD
Attorney

Sept. 4, 1962  C. G. SHEPHERD  3,052,372
HINGE STRUCTURE
Filed Feb. 29, 1960  2 Sheets-Sheet 2
FIG.6. 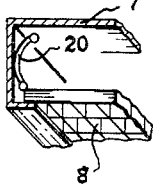 FIG.8. 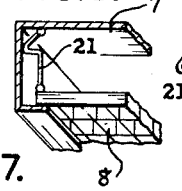 FIG.10. 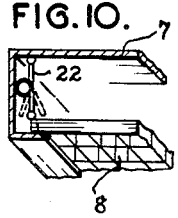
FIG.7.  FIG.9.  FIG.11.
FIG.12. 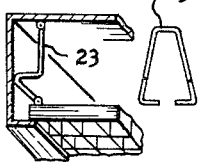 FIG.14. 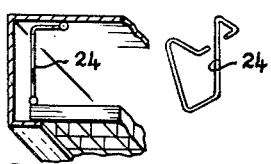 FIG.16. 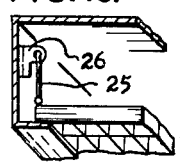
FIG.13.  FIG.15.  FIG.17.
FIG.18. 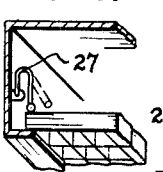 FIG.20. 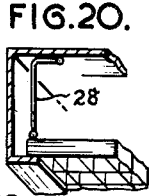 FIG.22. 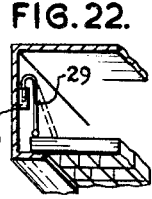
FIG.19.  FIG.21.  FIG.23.
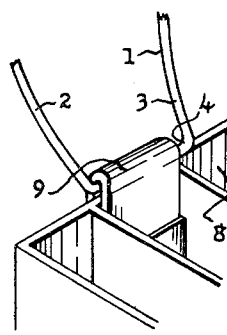
FIG.24.
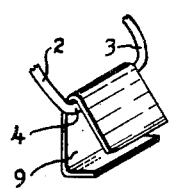
FIG.25.
Inventor
CHARLES GREY SHEPHERD
Attorney

United States Patent Office 3,052,372
Patented Sept. 4, 1962

3,052,372
HINGE STRUCTURE
Charles Grey Shepherd, Don Mills, Ontario, Canada, assignor to Garcy Company of Canada Limited, Toronto, Ontario, Canada, a company of Ontario
Filed Feb. 29, 1960, Ser. No. 11,609
3 Claims. (Cl. 220—38)

My present invention relates to a hinged structure and appertains particularly to one that is inherently resilient or that incorporates a spring action whereby a thrust may be imparted to one of the engaged parts.

Capable of assuming many shapes or forms and adapted for a wide variety of uses, this spring action hinge which may be described as a link hinge acts, in a sense, as a torque-link hinge; the link portion, by virtue of the nature of its mounting and/or its spring characteristic, allowing movement to vary the location of the pivot or pivot pin portion.

A suitable application of the present spring hinge is to be found in lighting fixtures, such as the fluorescent type, which commonly incorporate a light diffuser and/or lamp shielding element which may be a metal or plastic cellular louvre panel (often called eggcrating), a transverse or cross louvre assembly, full translucent plastic pan or the like. Because such a diffuser or light shielding element must be readily removable for servicing the fixture and because loose components are found awkward, it is a generally accepted practice of manufacturers to provide a hinge connection between the fixture and the diffuser. Here the present hinge structure serves admirably, combining in one single, positive and inexpensive unit all the usually sought and desirable characteristics and also some unique properties as will be noted in the following description.

Accordingly, it is an object of this invention to provide a hinge device in which the pivot pin has an integral flexible arm.

A further object of the invention is to provide a hinge in which a flexible mounting link or arm integral with the pivot pin provides a spring action thrust to the pin-carried member and allows for moving the axis of the pin.

A further object of the invention is to provide a spring link hinge, consisting of a pivot pin and an integral radial flexible link, for connection by the pin and link respectively to two individual members to relate them for both hinging and sliding movement.

A further object of the invention is to provide a spring action link hinge that may be employed to pivotally connect and releasably lock two members together, and by virtue of the thrust of the flexed spring act to dampen or eliminate vibration and rattles.

A further object of the invention is to provide a hinge having a flexible supporting link that can impart a thrust to the hinged member in one direction and allow some freedom of movement at right angles to the direction of thrust for adjustment or self alignment of the said hinged member.

A still further object of the invention is to provide a spring action hinge for connecting two members, such as a fluorescent lighting fixture and a light diffuser, in both hinging and sliding relation to lock the latter in rattle-proof closed position yet allow of its movement against the spring to release the same and permit it to hinge into open position affording access to the fixture, wherein the said hinge is applicable to and removable from the supporting fixture without the use of tools.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

FIGURES 6, 8, 10, 12, 14, 16, 18, 20 and 22 are perspective views of nine more modified forms of the hinge applied in each case to a fixture and its diffuser;

FIGURES 7, 9, 11, 13, 15, 17, 19, 21 and 23 are enlarged perspective views of the respective spring hinges shown in the foregoing FIGURES 6 to 22;

FIGURE 24 is an enlarged perspective detail of a clip suitable for attaching the hinge to a plastic louvre diffuser; and FIGURE 25 is a detail showing the hinge attached by such a clip to the plastic louvre diffuser.

The better to explain its construction and operation, the instant hinge device is shown and described as applied to and used with a fluorescent type lighting fixture with a hingedly connected and releasably held light diffuser, but it is to be understood that any two suitable members it is desired to relate in comparable manner may be substituted therefor.

Figure 1:
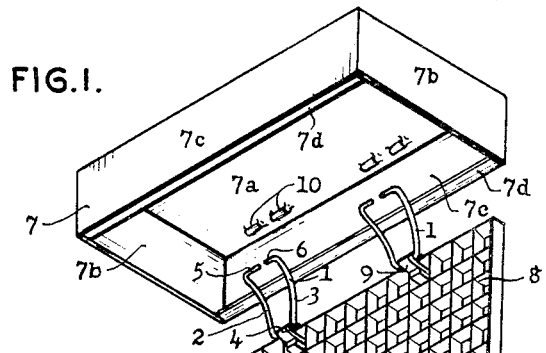
FIGURE 1 is a perspective view of a preferred embodiment of the invention as applied to the diffuser of a fluorescent lighting fixture and prior to attachment to the supporting fixture.
Figure 2:
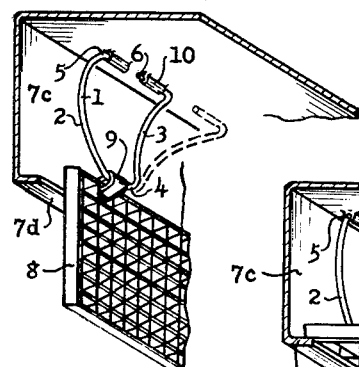
FIGURE 2 is a perspective view of the same after the hinge has been connected to the fixture.
Figure 3:
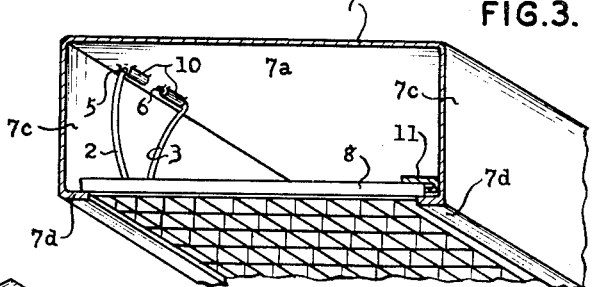
FIGURE 3 is a further perspective view of the same after the diffuser has been hinged into raised position, forced against the spring action of the hinge and finally spring thrust into releasably locked position in the fixture.

The hinge 1, seen in FIGURES 1, 2 and 3, consists of a length of spring wire doubled into U-shape with the two spaced arms 2 and 3 connected at the bottom by a short straight portion or reach 4 and spreading slightly toward the top where their free ends are terminally bent toward each other in aligned fingers 5 and 6 that parallel the straight reach 4. Additionally, the arms 2, 3 are bowed to define an arc relative to the plane in which the fingers 5, 6 on the free ends of the arms and the straight reach 4 lie.

The lighting fixture 7 such as the jacket of a fluorescent luminaire is represented simply by an elongated rectangular housing having a closed top 7a, ends 7b and sides 7c that have confronting inwardly directed horizontal flanges 7d and these side wall flanges and the lower edges of the end walls define a bottom opening in which the light diffuser such as the eggcrate-type louvre 8 of proper size and proportions is disposed.

Firstly, the hinge member 1 is attached to the diffuser 8. If the diffuser is of metal, the straight portion 4 at the base of the hinge U may be applied directly to the diffuser by insertion in a drilled opening or openings or a metal flange or lip on the diffuser could be rolled over to embrace the hinge part. As the diffuser 8 illustrated herein is of plastic, I find an untempered clip 9 formed of rolled steel ribbon (see FIGURES 24 and 25) a very simple and efficient means of permanently attaching the hinge 1 to the eggcrate louvre or diffuser 8; being wrapped around the appropriate section of the eggcrate and the straight reach 4 of the hinge to embrace the latter loosely enough to allow its relative pivotal movement as it serves as the axis or pivot pin of the hinge; the ends of the clip being overlapped. Because of its diminutive size and streamlined shape, conforming well to the sections of the eggcrate, such a clip normally passes detection.

The connection of the hinge 1 to the fixture 7 may be done in several ways, the preferred structure being shown clearly in FIGURES 1, 2 and 3. Here a spaced pair of aligned cylindrical pockets 10 are formed on the underside of the fixture top 7a. If the fixture be of metal they are pressed in, if of plastic they may be extruded. The pockets 10 have an interior diameter to freely accommodate the fingers 5, 6 of the hinge arms and have their opposite ends spaced a distance just greater than the normal spread of the upper ends of the arms 2, 3 which are sprung apart, as shown in FIGURE 2, for insertion of the fingers 5, 6 therein. Thus it will be seen that the diffuser-carried hinge 1 may be easily attached to or disconnected from the fixture without the use of tools of any kind.

The diffuser 8 is of a length just less than the length of the opening in the bottom of the light fixture 7 and of a width slightly less than the width of the bottom opening plus the width of one of the inturned side flanges 7d, see FIGURE 3. Along the side 7c remote from the hinge pockets 10, a channel strip 11 is secured by its base to the fixture 7, paralleling the adjacent side flange 7d that it overlies, having a shorter leg on the lower side that is about half the width of the flange and a longer upper leg that projects beyond the edge of the flange. This longer upper leg of the channel strip 11 acts as a vertical stop for the upward swinging of the diffuser 8 at the proper height above the flange 7 at which level the edge of the diffuser under action of the spring hinge slides horizontally between this longer upper leg and the fixture flange. The shorter lower leg of the channel 11 serves as a spacer to limit the horizontal thrust of the diffuser 8 toward the adjacent wall 7c under the action of the spring link arms 2, 3 of the hinge 1, so that the channel may be regarded as both a vertical and horizontal stop or as a hinging and sliding stop.

In operation, it will be obvious that a diffuser 8, slung by a pair of spring link hinges 1 from the top of an open bottom fixture 7, as seen in FIGURE 2, may be pivoted on the pivot pin or axis part 4 into horizontal position, clearing the flange 7d on the opposite side by pressing the hinge toward the adjacent side of the fixture against the spring action of the link arms until the diffuser edge contacts the projecting upper leg of the channel stop 11 and then releasing the pressure on the spring link hinge so that it thrusts the diffuser horizontally between the upper leg of the channel strip 11 and the confronting flange until it abuts the spacer leg of the channel and is arrested thereby; the hinge carried edge of the diffuser having been pressed against the force of the spring into engagement or near contact with the adjacent wall, during the upward hinging movement and until the opposite or free edge had passed through the open bottom of the fixture, comes to rest about midway of the width of the underlying flange when the pressure against the action of the spring is released and the diffuser is secured at its opposite edge by the channel and cooperating fixture flange in what may be termed "locked" or "closed" position. Conversely the fixture may be opened by pressing the diffuser toward the hinged side against the action of the spring until the free edge clears the fixture flange and then releasing the pressure and allowing the diffuser to swing downwardly into the position shown in FIGURE 2 with the pivot moving freely away from the near side of the fixture under the swinging of the link arms in their pockets in the top of the fixture and/or the flexing of the spring link arms.

Though the hinge 1 has been described as formed of a length of spring wire, it could be made of a flat ribbon of spring steel and can be made in many various forms, some of which are depicted in the drawings in FIGURES 4 to 23 inclusive. In the preferred form already described and shown in FIGURES 1 to 3 inclusive, the spring pressure exerted on the diffuser 8 to thrust and lock the free or swinging edge of the same securely in the fixture 7 results from the arc of the bowed arms 2, 3 engaging the inner face of the adjacent side 7c of the fixture and as the diffuser is pressed against the spring, such spring arms flex from the point of their engagement with the fixture side wall. Thus it will be noted that this spring link hinge has three points of engagement; viz, the upper end swingingly held in the embossed pockets 10 in the fixture top, the bowed arms contacting with the fixture's side wall and the hinge pin pivot connection at the lower end with the diffuser, all performing cooperatively yet each serving its own particular function.

In the simple form of hinge 20 shown in FIGURES 6 and 7 there is the same bowed form and the same engagement of an inturned finger at the upper end in an embossed pocket in the top of the fixture and the same straight hinge pin reach on the lower end for pivotal attachment to the diffuser; it differs chiefly from the previously described link spring structure in having only one arm instead of two.

In FIGURES 8 and 9 the hinge 21 is of U-form but the arms instead of being bowed are bent angularly out of the plane in which the inturned fingers at the top and the straight pivot pin reach at the bottom lie, so that it is this angular projection instead of the bowed arc that makes the intermediate point of contact with the fixture side wall.

In FIGURES 10 and 11, the U-shaped spring hinge 22 includes a projecting coil or convolution that provides the intermediate contact point and also imparts increased spring action to the pivot pin part of the member.

The hinge 23 shown in FIGURES 12 and 13 is very similar in form to that illustrated in FIGURES 8 and 9, having angular projections in the arms, but is inverted so that the inturned fingers on the ends of the arms of the U are both connected to the diffuser as by the clips previously described and serve as a pair of aligned pivot pins and the straight reach portion at the base of the U is now at the top and is engaged by a suitably embossed lug or pocket in the top of the fixture.

Hinge 24, in FIGURES 14 and 15 has a right angle bend in the arms of the U near their upper end and such bent upper ends engage the top of the fixture instead of the side wall thereof.

The hinge 25, of FIGURES 16 and 17, is carried by a bracket 26 on the fixture side wall and the arms of the U-shaped member, besides having inturned terminal fingers, have a reach portion adjacent to and paralleling the end finger on each arm that makes a second contact with the bracket thus imparting a comparable spring action to the pivot pin reach at the base of the hinge.

A single arc spring hinge 27 is seen in FIGURES 18 and 19, its oppositely extending parallel ends attaching respectively to the fixture and diffuser.

In FIGURES 20 and 21 the one arm spring hinge 28 is provided, like the two-arm U shaped form 24, with a right angle bend near its upper end that makes contact with the top of the fixture. Additionally, it will be noted that the parallel finger at the upper end of the arm and the straight pivot pin reach at the lower end extend from opposite sides of the arm and the pivot pin reach has a short up-bent finger for more secure engagement by the diffuser clip.

The form of hinge 29 seen in FIGURES 22 and 23 is another one that employs a bracket 30 on the side wall of the fixture; whereas the arms of U-shaped hinge 25 mentioned herein before were inserted in its bracket 26 from the outer sides thereof, the upper ends of the arms of this hinge 29 are doubled backwards and downwards and are disposed within an outwardly offset intermediate portion of the bracket and the terminal fingers project outwardly through the bracket in opposite directions.

Figure 4:
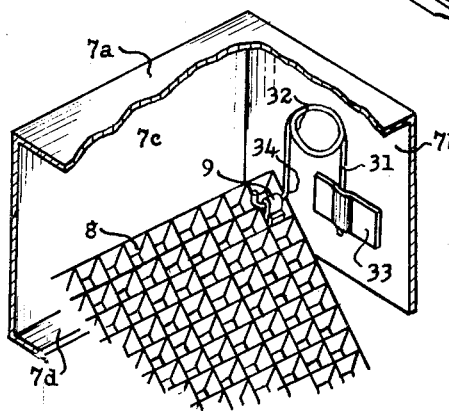
FIGURE 4 is a perspective view of a modified form of the hinge connecting a diffuser to a lighting fixture, with the diffuser in open position.
Figure 5:
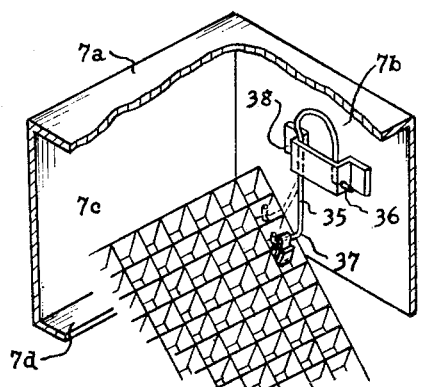
FIGURE 5 is a similar perspective view of a further modification of the hinge.

In FIGURES 4 and 5 are shown two further modifications of the spring hinge that are each carried in a bracket on the end of the fixture rather than on the side wall or top thereof.

The hinge 31 in FIGURE 4 is in the form of an inverted U with a convolution 32 at its base and one arm depending therefrom is secured in a bracket 33 on the end 7b of the fixture near the side thereof and the other arm substantially paralleling the first is terminally bent at right angles in a straight reach 34 that extends parallel to the fixture side wall and serves as the pivot pin being attached by a clip 9 in the usual way to the diffuser 8.

Similarly, the hinge 35 shown in FIGURE 5 is of inverted U-shape with one short arm terminating in an out-turned finger 36 and the other arm being longer and terminally provided with a pivot pin reach 37 at right angles both to the length of the arm and also to the plane in which the U lies so that it projects horizontally and parallel with the side 7c of the fixture while the U is held captive in an offset bracket 38 mounted on the end wall 7b with the finger 36 projecting through an end of said bracket.

In the various forms of the hinge thus shown and described it will be noted that the link or arm part, by virtue of its inherent flexibility allows a horizontal change of location of the louvre or diffuser pivot pin following release of the hingedly carried member that in so moving creates pivotal clearance for such member to swing downwards. The same spring action and movement of the pivot pin, when the member is in fully raised position and engaging the channel stop on the opposite side of the fixture, is translated into the horizontal locking motion and it is against this spring action that the diffuser member must be moved to effect subsequent disengagement.

For hingedly carrying a member in releasable normally locked relation such as a diffuser element in an open bottom fluorescent fixture, the present integral spring link hinge is possessed of substantial and valuable advantages including the following:

A. The hinge is virtually invisible, having no appreciable mass or bulk, no externally visible components, no metal tabs, finger pulls, catches or slots.

B. It creates no undesirable shadows, nor does it materially affect the light pattern or performance of the fixture as a lighting device.

C. It neither causes nor allows light leaks in the fixture body.

D. The hinge holds the diffuser panel under spring tension, eliminating rattles and noises caused by ballast or external vibrations. This tension also prevents accidental disengagement, such as may be caused by vibratory creeping or an accidental blow or jar.

E. The hinge attachment does not demand a full metal framing of the diffuser material, or other elaborate secondary structures.

F. The hinge provides positional flexibility, longitudinally, to allow the diffuser panel a margin of alignment with fixture.

G. The hinge provides for a positive and automatic change of location of the pivot point, in operation, insuring adequate swinging clearance of the diffuser, and, therefore, protects the finish from scratches and scraping.

H. The hinge, in arcing into its closed position, may automatically insure a close fit of diffuser to fixture flange; and conversely, allows clearance at this point on moving into its open position.

I. The hinge allows arbitrary installation on either side of the fixture, thereby obviating the need to orient fixtures in this respect when installing.

J. The hinge is capable of allowing simple and complete disengagement of the diffuser unit from the body without tools.

K. The hinge, by being attached to the diffuser, allows unhampered cleaning of the fixture itself.

From the foregoing description taken in connection with the accompanying drawing, it will be manifest that a hinge structure is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. For connecting a fixed member having a top and two side walls, to a slidable member in hinged and endwise aligning sliding relation, a hinge device having a pivot pin portion pivotally attached to the top wall adjacent a side wall, an integral arcuate arm attached to the pivot pin and in intimate engagement with the adjacent side wall, a pin extending from the arcuate arm and pivotally connected to the slidable member, a channel strip on the other side wall co-acting with the end of the slidable member remote from the hinge to serve as a stop.

2. For connecting a fixed member having a top, side, and end walls to a sliding member in hinged and endwise aligning sliding relation, a hinge device having a pivot pin portion pivotally attached to the top wall adjacent a side wall, an integral arcuate arm attached to the pivot pin and in intimate engagement with the adjacent side wall, a pin extending from the arcuate arm and pivotally connected to the sliding member, the side walls of the fixed member being formed at their lower edges with oppositely disposed side flanges, a channel strip secured to the other side wall of the fixed member and paralleling an adjacent side flange coacting with an edge portion of the sliding member to serve as a stop.

3. For connecting a fixed member having a top, two side walls and end walls to a slidable member in hinged and endwise aligning sliding relation, a hinge consisting of a length of spring wire bent into U shape with the two spaced arms connected at the bottom by a short reach portion, the upper ends of the arms being bent inwardly and in alignment with each other, the reach being pivoted to the slidable member, and the offset upper ends being pivoted to the fixed member, the said arms being arcuate to abut on an adjacent side wall of the fixed member, and a channel strip on the other side wall of the fixed member remote from the hinge coacting with an edge portion of the slidable member to serve as a stop.

References Cited in the file of this patent

UNITED STATES PATENTS

| | | |
|---|---|---|
| 546,304 | Davidson | Sept. 17, 1895 |
| 569,474 | Rodes | Oct. 13, 1896 |
| 1,676,865 | Mangialetti | July 10, 1928 |
| 1,950,465 | Whitlock | Mar. 13, 1934 |
| 2,112,451 | Best et al. | Mar. 29, 1938 |
| 2,385,364 | Larson | Sept. 25, 1945 |
| 2,442,873 | Graham | June 8, 1948 |
| 2,621,286 | Mendelson | Dec. 9, 1952 |
| 2,650,783 | Stanley | Sept. 1, 1953 |
| 2,670,872 | Olesky | Mar. 2, 1954 |
| 2,682,969 | Sunko | July 6, 1954 |
| 2,792,245 | Dasher et al. | May 14, 1957 |
| 2,951,611 | Tillson et al. | Sept. 6, 1960 |

FOREIGN PATENTS

| | | |
|---|---|---|
| 461,575 | Great Britain | Feb. 19, 1937 |